April 20, 1937.  W. A. BROYLES  2,078,121
INSTRUMENT PANEL ASSEMBLY
Filed Jan. 7, 1936
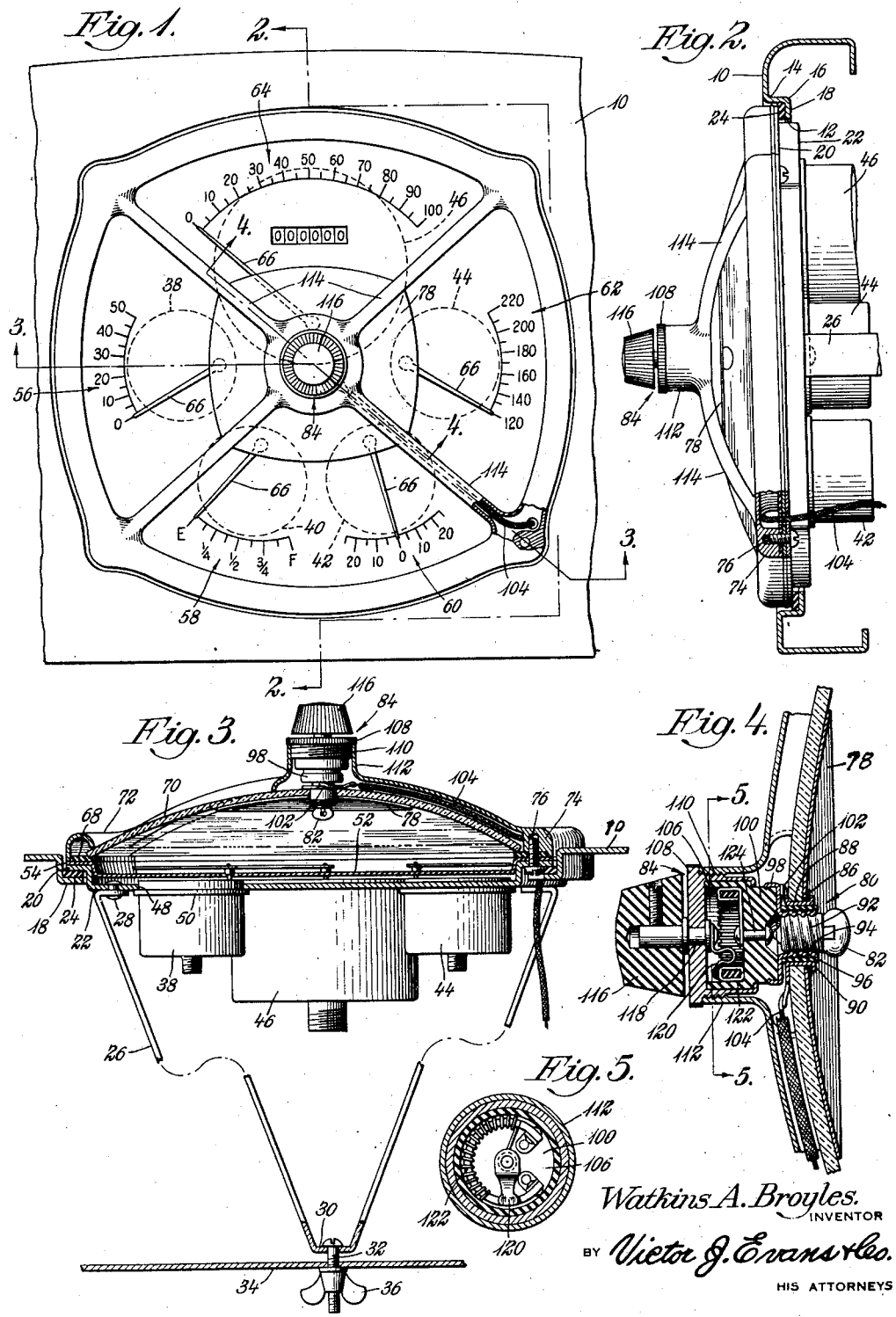
Watkins A. Broyles.
INVENTOR
BY Victor J. Evans & Co.
HIS ATTORNEYS Patented Apr. 20, 1937

2,078,121

UNITED STATES PATENT OFFICE 2,078,121

INSTRUMENT PANEL ASSEMBLY

Watkins A. Broyles, Eagleville, Mo.

Application January 7, 1936, Serial No. 57,986

5 Claims. (Cl. 240—8.16)

My invention relates to automotive vehicles, and has among its objects and advantages the provision of an improved system of illumination for the several instruments mounted on the instrument board of vehicles.

In the accompanying drawing:

Fig. 1 is a plan view of a group of instruments embodying the invention;

Fig. 2 is a sectional view along the line 2—2 of Fig. 1;

Fig. 3 is a sectional view along the line 3—3 of Fig. 1;

Fig. 4 is an enlarged sectional view of my rheostat switch and the method of mounting the electric lamp; and Fig. 5 is a sectional view along the line 5—5 of Fig. 4.

In the embodiment selected to illustrate my invention, I make use of the instrument board 10, which may be of conventional design. This board is provided with an opening 12 and the material of the board around the opening is bent at 14 and 16 to provide a flange 18 positioned inwardly of the face of the board.

Between the flange 18 and the flange 20 of an instrument supporting plate 22, I position a rubber ring 24. The plate 22 is drawn firmly against the ring 24 by means of a bracket 26 riveted to the plate 22 at 28. In Fig. 3, the bight 30 of the bracket is provided with an opening for the reception of a screw 32 passing through a fixed support 34 such as the bulkhead of the vehicle. The necessary pull is exerted upon the bracket 26 by tightening the nut 36 on the screw 32.

Upon the plate 22 I mount an oil pressure gauge 38, a gasoline gauge 40, an ammeter 42, a temperature gauge 44, and a speedometer 46. These gauges are of conventional design and need not be described in detail. I prefer to provide the plate 22 with openings for receiving the instruments 38 to 46, which instruments may be pressed into their respective openings as indicated at 48 in Fig. 3 and firmly secured therein by welding or other suitable means. The instruments may be provided with flanges 50 for determining the accurate positioning of the devices.

The dial plate 52 extends over the inner ends of the instruments and is provided with a flange 54 lying against the flange 20. I provide the dial plate 52 with a series of dial readings 56, 58, 60, 62, and 64, for the instruments 38 to 46, respectively. These instruments are provided with conventional pointers 66 arranged in operative relation with the dial readings.

A rubber ring 68 is placed upon the flange 54 to provide a bed for a glass 70 having its edge resting on the rubber ring. I fixedly connect the glass in position by a bezel 72 arranged to press against the glass. This bezel is provided with enlargements 74 having threaded openings for the reception of screws 76 passing through the ring 68 and the flanges 54 and 20. All these parts are drawn firmly together when the screws 76 are tightened.

Referring to Figs. 3 and 4, I mount a reflector 78 adjacent the inner face of the glass 70 and centrally thereof. Both the glass and the reflector are provided with aligned openings for the mounting of a light assembly 80 (see Fig. 4). The lamp assembly includes an electric lamp 82 for illuminating the dial readings upon the plate 52. In addition to direct illumination, the reflector 78 provides an intensified illumination. The degree of illumination may be controlled by a rheostat switch 84.

The opening in the reflector 78 is slightly larger than the opening in the glass 70 for receiving a rubber liner 86. This liner is positioned between the edge of the opening in the reflector and a metallic liner 88 fitting snugly within the opening in the glass. The liner 88 is of tubular construction, and its ends are flared at 90 for connecting the reflector to the glass.

The metallic screw part 92 of the electric light is screwed into a socket 94 which is separated from the liner 88 by a rubber cushion 96. The socket 94 terminates in a flange 98 connected with a rheostat switch body 100. The flange 98 and the liner 88 are electrically connected at 102 and the latter is electrically connected with the battery of the car through the medium of the conductor 104.

The rheostat switch body 100 is provided with a bore 106, which bore is closed by means of a cap 108 having threaded relation at 110 with a tubular member 112 connected with the bezel 72 through the medium of ribs 114. The ribs 114 are semicircular in cross section for strengthening purposes. At the same time, one of the ribs provides a housing for the conductor.

Upon the cap 108 I mount a knob 116 for operating the rheostat switch. This knob is fixedly connected with a shaft 118 having a contact arm 120 arranged to be moved into electrical contact with the rheostat winding 122 which is electrically connected with the pin 124 having electrical contact with the central terminal of the electric lamp 82. The cap 108 possesses conducting properties, which is also true of the member 112 and its associated parts. Thus, the bezel 72 is electrically connected with the plate 52 which is grounded to the car. The circuit to the lamp 82 may be opened and closed and the intensity of the illumination varied through the adjustment of the knob 116.

My arrangement is such that one lamp provides efficient illumination for all the instruments in addition to the instrument panel. The reflector 78 performs an efficient intensifying function in addition to shielding the light 82 from the eyes of the driver. The rubber rings 24 and 68 provide a cushioning function and eliminate noise. A single bracket holds the assembly in mounted relation with the instrument board 10, while the assembly may be disconnected by removing the screws 76.

While I have shown the reflector 78 as conforming to the face of the glass 70, it will be understood that the reflector may be shaped to define different configurations on different sides of the light 82 for restricting or reflecting light rays in different directions.

Without further elaboration, the foregoing will so fully explain my invention that others may, by applying current knowledge, readily adapt the same for use under various conditions of service.

I claim:

1. An instrument mount for motor vehicles, comprising a support for a plurality of register instruments, a dial plate extending across said instruments, a sight glass extending across the dial plate in spaced relation therewith, means for connecting the glass, the dial plate, and said support into a unitary whole, an electric light carried by said glass for illuminating the dial plate, a shield arranged in operative relation with the electric light for rendering the same invisible, and a rheostat switch associated with the electric light, said means comprising a part of the circuit for the rheostat switch.

2. An instrument mount for motor vehicles, comprising a support for a plurality of register instruments, a dial plate extending across said instruments, a sight glass extending across the dial plate in spaced relation therewith, means for connecting the glass, the dial plate, and said support into a unitary whole, an electric light carried by said glass for illuminating the dial plate, and a rheostat switch connected with said electric light, said means comprising a part of the circuit for the rheostat switch.

3. An instrument mount for motor vehicles, comprising a support for a plurality of register instruments, a dial plate extending across said instruments, a glass extending across the dial plate in spaced relation therewith, an electric light carried by the glass, a rheostat switch connected with the light, and means for securing the glass in position and supporting the rheostat switch, said means comprising in part a part of the circuit for the electric light.

4. An instrument mount for motor vehicles comprising a support for a plurality of register instruments, a dial plate extending across said instruments, a transparent sight element extending across said dial plate in spaced relation therewith, means for connecting the transparent sight element, the dial plate and said support into a unitary assembly, an electric light carried by said transparent sight assembly for illuminating the dial plate, a shield arranged in operative relation with the electric light for rendering the same invisible to occupants of the motor vehicle, a switch associated with the electric light, said means comprising a part of the circuit for the switch, a pair of spaced fixed supports, one of said fixed supports constituting an abutment for said unitary assembly, and tension means connected with the unitary assembly and the other of said fixed supports for holding the unitary assembly in position.

5. An instrument mount for motor vehicles comprising a support for a plurality of register instruments, a dial plate extending across said instruments, a transparent sight element extending across the dial in spaced relation therewith, means for connecting the transparent sight element, the dial and said support into a unitary assembly, an electric light carried by said transparent sight element for illuminating the dial, a shield arranged in operative relation with the electric light for rendering the same invisible to occupants of the motor vehicle, and a switch associated with the electric light, said means comprising a part of the circuit for the switch.

WATKINS A. BROYLES.